US012546523B2

(12) United States Patent
Behmüller et al.

(10) Patent No.: US 12,546,523 B2
(45) Date of Patent: Feb. 10, 2026

(54) SYSTEM AND METHOD FOR MAINTAINING A SNOW PISTE

(71) Applicant: Kässbohrer Geländefahrzeug AG, Laupheim (DE)

(72) Inventors: Andreas Behmüller, Illerkirchberg (DE); Claudius Henger, Achstetten (DE)

(73) Assignee: Kässbohrer Geländefahrzeug AG, Laupheim (DE)

( * ) Notice: Subject to any disclaimer, the term of this patent is extended or adjusted under 35 U.S.C. 154(b) by 532 days.

(21) Appl. No.: 18/046,726

(22) Filed: Oct. 14, 2022

(65) Prior Publication Data

US 2023/0184476 A1 Jun. 15, 2023

(30) Foreign Application Priority Data

Oct. 15, 2021 (DE) .......................... 102021211674.4
Jul. 25, 2022 (EP) ...................................... 22186655

(51) Int. Cl.
*F25C 3/04* (2006.01)
*G05B 15/02* (2006.01)

(52) U.S. Cl.
CPC ................ *F25C 3/04* (2013.01); *G05B 15/02* (2013.01); *F25C 2600/04* (2013.01)

(58) Field of Classification Search
None
See application file for complete search history.

(56) References Cited

U.S. PATENT DOCUMENTS

| | | | | |
|---|---|---|---|---|
| 4,914,923 A | * | 4/1990 | Duplan ................. | E01C 13/105 62/235 |
| 5,659,984 A | * | 8/1997 | Haug .................. | C07F 9/65742 37/219 |
| 6,466,870 B2 | * | 10/2002 | Satonaka .................. | F25C 3/04 701/468 |
| 6,508,717 B2 | * | 1/2003 | Katayama .............. | A63C 19/10 472/91 |
| 10,612,202 B1 | * | 4/2020 | Jones ...................... | E01H 5/066 |

(Continued)

FOREIGN PATENT DOCUMENTS

| | | | | |
|---|---|---|---|---|
| CA | 3022235 A1 | * | 4/2019 | ............. E01H 5/098 |
| CN | 120508792 A | * | 8/2025 | ............. G05B 15/02 |

(Continued)

OTHER PUBLICATIONS

Fauve et al., "Preparation and maintenance of pistes Handbook for practitioners", 2002, Swiss Federal Institute for Snow and Avalanche Research SLF, Davos. (Year: 2002).*

(Continued)

*Primary Examiner* — Mohammad Ali
*Assistant Examiner* — Kelvin Booker
(74) *Attorney, Agent, or Firm* — FLYNN THIEL, P.C.

(57) ABSTRACT

A computer-aided method for maintaining a snow piste, according to which state data relating to the snow piste are captured in a time-dependent manner. The state data include snow constitution data which depend on a constitution of a piste surface of the snow piste, a prediction model for the state of the snow piste at at least one point in time in the future is calculated from the captured state data, and information relating to the prediction model is output.

15 Claims, 2 Drawing Sheets

(56) References Cited

U.S. PATENT DOCUMENTS

| | | | |
|---|---|---|---|
| 11,105,058 B2 * | 8/2021 | Holzapfel | E01H 4/02 |
| 2002/0116122 A1 * | 8/2002 | Satonaka | F25C 3/04 |
| | | | 342/357.57 |
| 2002/0165034 A1 * | 11/2002 | Katayama | A63C 19/10 |
| | | | 472/91 |
| 2019/0235499 A1 * | 8/2019 | Kazemi | G01S 17/931 |
| 2020/0109532 A1 * | 4/2020 | Betz | E01H 4/02 |
| 2023/0184476 A1 * | 6/2023 | Behmüller | G05B 15/02 |
| | | | 700/28 |
| 2024/0253664 A1 * | 8/2024 | Zhang | G01C 21/3438 |
| 2024/0378256 A1 * | 11/2024 | Sadr | G06F 16/9538 |
| 2024/0410708 A1 * | 12/2024 | Fei | G01C 21/3889 |
| 2025/0162096 A1 * | 5/2025 | Scriven | A63C 11/06 |
| 2025/0162097 A1 * | 5/2025 | Scriven | B24B 3/006 |

FOREIGN PATENT DOCUMENTS

| | | | | |
|---|---|---|---|---|
| EP | 1182409 B1 | | 2/2002 | |
| EP | 3633107 A1 | | 4/2020 | |
| FR | 3086304 A1 | * | 3/2020 | E01H 4/02 |
| JP | H08261616 A | * | 10/1996 | E01H 4/02 |
| WO | 2020065607 A1 | | 4/2020 | |
| WO | 2020119514 A1 | | 6/2020 | |

OTHER PUBLICATIONS

Howard et al., PISTE: A Snow-Physics Model Incorporating Human Factors for Groomed Ski Slopes, Jan. 2014, American Meteorological Society. (Year: 2014).*

Prokop et al., "A new methodology for planning snow drift fences in alpine terrain", Nov. 2014, Cold Regions Science and Technology 132 (2016) 33-43. (Year: 2014).*

Hamilton et al., "Ski areas, weather and climate: Time series models for New England case studies", Dec. 2007, University of New Hampshire University of New Hampshire Scholars' Repository. (Year: 2007).*

Ebner et al., "Evaluating a prediction system for snow management", Feb. 2021, The Cryosphere, 15, 3949-3973, 2021. (Year: 2021).*

Nelson, M.M., "Vehicles, Grooming, and Other Factors Affecting Snowroad Longevity in Yellowstone National Park", Apr. 2018, Thesis, Master of Science in Civil Engineering, Montana State University. (Year: 2018).*

Spandre et al., "Determination of snowmaking efficiency on a ski slope from observations and modelling of snowmaking events and seasonal snow accumulation", Aug. 2016, The Cryosphere, 11, 891-909, 2017. (Year: 2016).*

Söderström et al., "Snow Grooming Using Machine Guidance for Piste Management Processes—Case Study: Ormberget Ski Piste", 2013, Luleå University of Technology. (Year: 2013).*

Howard et al., PISTE: A Snow-Physics Model Incorporating Human Factors for Groomed Ski Slopes, 2014, American Meteorological Society. (Year: 2014).*

Brockschmidt et al., "Enhancing Slope Management Through IoT Snow Monitoring: a Case Study in Fieberbrunn, Tyrol", 2024, Proceedings, International Snow Science Workshop, Tromsø, Norway. (Year: 2024).*

European Search Report issued in corresponding European Application No. 22186655.1 with English translation of categories of cited documents, dated Jan. 2, 2023 (7 pages).

* cited by examiner

SYSTEM AND METHOD FOR MAINTAINING A SNOW PISTE

CROSS-REFERENCE TO RELATED APPLICATIONS

This claims priority from German Application No. 10 2021 211 674.4, filed Oct. 15, 2021, and European Application No. 22186655.1, filed Jul. 25, 2022 the disclosures of which are hereby incorporated by reference in their entirety.

TECHNICAL FIELD

The invention relates to a computer-aided method for maintaining a snow piste, according to which state data relating to the snow piste are captured in a time-dependent manner. The invention also relates to a computer-aided system for carrying out such a method, having a state sensor system for acquiring state data relating to a snow piste, and having a time capture unit which is coupled to the state sensor system in order to capture state data relating to the snow piste in a time-dependent manner.

BACKGROUND AND SUMMARY

It is known from practice to enable a piste state of a snow piste in a ski area to be subjectively assessed by experienced personnel. On the basis of the subjective assessment, piste groomers that prepare corresponding snow pistes are controlled by likewise experienced personnel. If artificial snow covering is assigned to the snow piste, further experienced personnel who operate the snowmaking machines are provided. Finally, a ski area is provided with lift systems that transport winter sports persons to various snow pistes within the ski area.

The object of the invention is to provide a method and a system of the type mentioned at the outset which permanently enable a good quality of snow pistes.

For the computer-aided method, this object is achieved by virtue of the fact that the state data comprise snow constitution data which depend on a constitution of a piste surface of the snow piste, and that a prediction model for the state of the snow piste at at least one point in time in the future is calculated from the captured state data, and that information relating to the prediction model is output. A subjective on-site assessment is obviated by virtue of the method according to the invention. Foresighted planning of preparation and snow covering of the snow piste is made possible on the basis of the prediction model. The prediction model makes possible, for one or more points in time in the future, predictions for at least substantially exact changes in the state of the snow piste, such that measures for maintaining the snow piste that avoid negative changes in the snow piste can be implemented foresightedly for this at least one point in time in the future. This ensures a homogeneous configuration of the snow piste and a good quality of the snow piste over a long period of time. The period of time can constitute only a few days, one or a few weeks or an entire winter season. Snow constitution data may be understood as meaning snow temperatures at different depths of the piste surface, snow hardnesses at different depths of the piste surface and also water proportions of the piste surface at different depths. The time-dependent capture of the data mentioned means capture at different points in time, whereby changes in the data are captured depending on the time that has elapsed. The prediction model is based on objective data and avoids subjective influences resulting from human evaluation. With the aid of empirical values, a future change in the constitution of the snow piste, on the basis of the current snow constitution data, can be expressed in the prediction model. In this case, time-dependent aging processes of the snow constitution can be included. For example, the snow constitution may change over time on account of aging owing to partial sublimation of the snow crystals or compression of the blanket of snow through its own weight.

Said information relating to the prediction model can concern individual functional areas necessary for maintaining the snow piste, or else groupwise assignments of a plurality of functional areas that interact.

In one configuration of the invention, the state data comprise, in particular in addition to the snow constitution data, snow covering data relating to the snow piste and topography data relating to the snow piste, wherein the snow covering data, the topography data and the snow constitution data are each captured in a time-dependent manner. Snow covering data can be understood as meaning both snow covering data relating to artificial snow covering and snow covering data relating to natural snow covering as a result of snowfall. Topography data relating to the snow piste may be snow heights and snow volumes and changes in these snow heights and snow volumes, in particular as a result of snow piste loads which may be caused by the weather or caused by humans. Topography data may also be the surface models of the mountain slope without the overlying blanket of snow. Changes in snow volumes and snow heights in different regions of the snow piste may arise in particular as a result of snow transport. The prediction model VM can be made more precise by including the snow covering data and the topography data.

In a further configuration of the invention, the snow constitution data are acquired by means of at least one piste groomer in a travel mode of the at least one piste groomer, in particular while the snow piste is being prepared by means of the piste groomer. The constitution of the piste surface can therefore be acquired at a plurality of locations, if desired even comprehensively, by driving over the piste surface by means of the piste groomer. Since the snow piste is usually driven over anyway in this manner when preparing the snow piste, the snow constitution data can therefore be acquired without any additional effort.

In a further configuration of the invention, a snow hardness or/and a snow temperature or/and a water proportion of the piste surface is/are acquired for the snow constitution data by means of at least one sensor system arranged on the piste groomer. In the present case, a sensor system should be understood as meaning a device comprising one or more sensors or measurement sensors which generate sensor data on the basis of an acquired measurement variable. Snow hardness, snow temperature or/and water proportion prove (s) to be particularly suitable for objectively describing the constitution of the blanket of snow, that is to say the piste surface.

The sensor system for acquiring the snow constitution data may be expediently arranged on a penetration device of the piste groomer, in particular a blade of the piste groomer that plunges into the blanket of snow, preferably at a constant depth, when traveling on the piste surface and is pulled through the piste surface. Alternatively or additionally, a structure-borne sound frequency can be measured by means of the sensor system for acquiring the snow constitution data and, when preparing the piste surface, is transmitted to the piste groomer and depends on the constitution of the piste surface. Such sensor systems allow the snow constitution data to be acquired in a particularly precise manner. The acquisition of the snow constitution data by means of a structure-borne sound frequency measurement also impresses in that the measurement itself can be carried out in a contactless manner and therefore there is no need to intervene in the blanket of snow.

In a further configuration of the invention, data relating to frequenting of the snow piste by persons engaging in winter sports are captured in a time-dependent manner and used to calculate the prediction model. These data enable conclusions to be drawn about the snow piste loading caused by humans and further improve the accuracy of the prediction model. The data relating to the frequenting of the snow piste by persons engaging in winter sports can be captured directly or indirectly. Direct capture should be understood as meaning, in particular, light barriers at the start of the snow piste. Indirect data should be understood as meaning capacity utilizations of at least one lift system that transports the persons up the mountain in order that the persons can move along the snow piste from the top.

In a further configuration of the invention, control instructions for operating the at least one piste groomer on the snow piste or/and for operating a snowmaking machine for the snow piste or/and for access to the snow piste for persons engaging in winter sports are generated on the basis of the prediction model. Corresponding control instructions can comprise route planning for the piste groomer along the snow piste and also snow transport planning by the piste groomer. The shaping of the piste surface by a rear cutter, the time expenditure for snow piste preparation and the number of piste groomers to be used and also personnel to be used can also be specified foresightedly.

The control instructions can either merely constitute information that is signaled to personnel or persons engaging in winter sports in the region of the snow piste. Alternatively or additionally, control instructions can also constitute the control of snowmaking machines, of lift systems, of signal generators for closing or opening the snow piste or for controlling the travel drive of the piste groomer or for controlling the rear cutter or clearing blade of the piste groomer.

If, in accordance with a further configuration of the invention, the control instructions are output, then these control instructions serve to inform personnel or persons engaging in winter sports.

If, in accordance with a further configuration of the invention, the control instructions are passed to the piste groomer or/and to the snowmaking machine or/and to stationary devices for controlling access to the snow piste for persons engaging in winter sports, then this should be understood as meaning control of the corresponding functional devices such as the piste groomer, snowmaking machine, lift system or signal generators that release or block access to the snow piste.

In a further configuration of the invention, the constitution of the piste surface is adapted, at least in certain areas, in particular as required, by means of the at least one piste groomer or/and the snowmaking machine on the basis of the control instructions. Since the control instructions depend on the prediction model, the constitution of the piste surface is also adapted on the basis of the prediction model. In this case, adaptation as required means that the piste surface can be adapted only in areas or/and only to an extent required for optimum piste quality overall. A particularly good piste quality can be achieved by adapting the constitution of the piste surface by mutually coordinating pushing work by means of the at least one piste groomer, a respective preparation time and situational use of snow covering.

In a further configuration of the invention, when capturing the snow constitution data, time-dependent data records of the snow constitution data are generated and, for each capture, comprise mutually assigned time data, geographical location data and quality data relating to the piste surface, wherein depth ordinates are preferably assigned to the quality data for each capture. In other words: the quality data may be provided with a digital location stamp and a time stamp in each data record. This advantageously results in a particularly accurate prediction model. In particular, a family of characteristics can be generated from the data records and can be used to visualize the snow constitution. This makes it possible to indicate in a particularly clear manner what constitution of the snow piste can be found at what time, where and, in particular, at what snow depth and will be able to be found at at least one point in time in the future. This can also be used with regard to a configuration of the control instructions, for example in order to indicate to a driver of the piste groomer or an operator of the snowmaking machine where exactly preparation measures are intended to be carried out and when.

In a further configuration of the invention, the quality data comprise a snow hardness or/and a snow temperature or/and a snow density or/and a water proportion. The snow constitution data therefore indicate the time at which, the geographical location at which and the snow depth at which a respective snow hardness, snow temperature, snow density or/and water proportion can be found. Accordingly, the prediction model can be made more precise.

The blanket of snow can be expediently assessed on the basis of the quality data with constitution attributes, in particular in certain areas. Such constitution attributes may be attributes such as "powdery", "icy", "grippy" or "slushy", "crusty" or the like which, despite objective determination of the quality data, provide the observer with a subjectively comprehensible picture of the constitution of the blanket of snow.

In a further configuration of the invention, the state data comprise snow height and volume data relating to the snow piste or/and topography data relating to the snow piste. The prediction model can be advantageously made even more precise by including further data in the prediction model.

In a further configuration of the invention, current or/and future meteorological data for an environment of the snow piste are captured in a time-dependent manner and are used to calculate the prediction model. This makes it possible to further improve the prediction model. The meteorological data should be understood as meaning weather data such as air temperature and air humidity, wind strength, wind direction, solar radiation, evaporation rates or else shading of the snow pistes by objects which cast shadows, such as, in particular, buildings, a forest or trees. The meteorological data can be collected both by local weather stations and by regional or global weather capture systems. This improves the accuracy of the prediction model.

In a further configuration of the invention, travel parameters or/and process parameters of at least one piste groomer preparing the snow piste are captured in a time-dependent manner and are used to calculate the prediction model. This also further improves the accuracy of the prediction model. Travel parameters should be understood as meaning travel speed, travel routes, travel direction changes and ongoing position changes of the piste groomer in the travel mode on the snow piste. The travel parameters of the piste groomer should also be understood as meaning an inclination of the piste groomer when preparing the snow piste, thus making it possible to draw conclusions about the inclination of the snow piste. Position changes of the piste groomer and the travel speed can be captured using global positioning systems or local positioning systems. Process parameters of the piste groomer should be understood as meaning operating data relating to a rear cutter and a front clearing blade of the piste groomer, in particular the rotational speed of the cutting shafts, the insertion depth of the rear cutter into the piste surface, the contact pressure of the rear cutter including a finisher on the piste surface, and, for the front clearing blade, adjustment positions of the clearing blade, shear loads of the clearing blade and snow volumes that are moved by the clearing blade.

In a further configuration of the invention, the captured state data are displayed by means of a display apparatus. An actual constitution of the snow piste can therefore be advantageously displayed for persons engaging in winter sports or/and for a driver of the at least one piste groomer or/and for operating personnel of snowmaking machines or/and lift systems. The display device may comprise a virtual map.

In a further configuration of the invention, the at least one piste groomer is controlled on the basis of the captured time-dependent snow constitution data. The piste groomer is preferably controlled on the basis of the prediction model calculated on the basis of the snow constitution data. The snow piste can therefore be prepared particularly well for an optimum state.

In a further configuration of the invention, information for controlling the route or/and functional parameters of the rear cutter or/and of the clearing blade, in particular the insertion depth of the rear cutter or/and the cutting shaft speed, is output to the driver of the piste groomer or/and to an autonomous control system for the piste groomer. This advantageously results in a further improvement in the preparation of the snow piste.

For the computer-aided system of the type mentioned at the outset, the object on which the invention is based is achieved by means described herein. The computer-aided system is used to carry out a method according to the invention as described above. It comprises a state sensor system for acquiring state data relating to a snow piste, and a time capture unit which is coupled to the state sensor system in order to capture the state data in a time-dependent manner. In this case, the state sensor system comprises at least one sensor system for acquiring snow constitution data relating to the piste surface of the snow piste, wherein an electronic data processing system is provided and is coupled to the state sensor system and the time capture unit in order to capture the state data and use the latter to calculate the prediction model for the state of the snow piste at at least one point in time in the future, wherein an output unit is connected to the data processing system and outputs information relating to the calculated prediction model. The above-mentioned advantages of the method according to the invention are also applied to the computer-aided system according to the invention for carrying out such a method.

In one configuration of the invention, the state sensor system comprises a sensor system for capturing snow covering data relating to the snow piste and a sensor system for capturing topography data relating to the snow piste, wherein the time capture unit is coupled to the respective sensor system in order to capture the snow covering data, the topography data and the snow constitution data in a time-dependent manner, wherein the electronic data processing system is coupled to the sensor systems and to the time capture unit in order to capture the data and use the latter to calculate the prediction model for a state of the snow piste at at least one point in time in the future. This makes it possible to set up a particularly precise prediction model.

In a further configuration of the invention, the system comprises at least one piste groomer, wherein at least one of the sensor systems for acquiring the snow constitution data is arranged on the piste groomer. Data for calculating the prediction model can therefore be advantageously acquired during piste preparation.

In a further configuration of the invention, at least one sensor system arranged on the piste groomer is arranged on a penetration device of the piste groomer, which is configured to plunge into the piste surface at a substantially constant depth when traveling on the piste surface and to be pulled through the blanket of snow. Such a sensor system allows the snow constitution data to be acquired in a particularly accurate manner.

In a further configuration of the invention, at least one sensor system arranged on the piste groomer is configured to acquire structure-borne sound frequencies which, when preparing the snow piste by means of the piste groomer, are transmitted to the piste groomer on the basis of the constitution of the piste surface in order to acquire snow constitution data. The acquisition of the snow constitution data by means of a structure-borne sound frequency measurement impresses in that the measurement itself can be carried out in a contactless manner and therefore there is no need to intervene in the blanket of snow.

In a further configuration of the invention, at least one sensor system for acquiring the snow constitution data is arranged on the piste surface, in particular is embedded in a blanket of snow of the piste surface. A plurality of such sensor systems may be distributed over the snow piste in a network-like or cluster-like manner. The snow constitution may be advantageously captured repeatedly at constant locations during a relatively long period of time, for example an entire season, using such a, preferably stationary, sensor system. This allows changes in the snow constitution to be determined in a particularly precise manner without distortion on account of local deviations.

In a further configuration of the invention, at least one sensor system is configured to acquire the state data, in particular the snow constitution data, in a continuous or temporally clocked manner. An acquired volume of data can therefore be optimally matched in terms of a desirably low processing and storage effort and, at the same time, a precise prediction model.

In a further configuration of the invention, the electronic data processing system has an interface for connection to a capture unit for meteorological data. This makes it possible to supply the meteorological data for making the prediction model more precise.

In a further configuration of the invention, the system comprises at least one piste groomer, wherein the electronic data processing system is wirelessly coupled to an electronic data capture unit which is assigned to the at least one piste groomer and captures position data and/or travel data relating to the piste groomer and/or process parameters of the rear cutter and of the clearing blade of the piste groomer. Subjective influences by the driver of the piste groomer can therefore be reduced.

In a further configuration of the invention, the electronic data processing system is coupled in a wireless or wired manner to a stationary counting device for directly or indirectly capturing persons who are engaging in winter sports and frequenting the snow piste. The determined data may be advantageously used to set up the prediction model in an even more accurate manner.

In a further configuration of the invention, the system comprises at least one stationary snowmaking machine assigned to the snow piste, wherein the electronic data processing system is coupled in a wireless or wired manner to a control device of the snowmaking machine in order to communicate control instructions for snow covering to the control device. This makes it possible to actively influence the snow constitution. In this case, the snow covering can be made particularly efficient with the aid of the prediction model.

In a further configuration of the invention, the electronic data processing system is wirelessly connected to a control unit of the piste groomer in order to communicate control instructions for controlling a travel drive and/or a rear cutter controller and/or a clearing blade controller to the control unit. This also allows spontaneous influence during ongoing use of the piste groomer for preparing the snow piste if the prediction model changes.

In a further configuration of the invention, a stationary device for controlling frequenting of the snow piste is provided, wherein the electronic data processing system is coupled in a wireless or wired manner to the device in order to communicate control instructions for changing the frequenting of the snow piste. This allows the frequenting to be controlled with the aid of the prediction model such that the piste quality retains a state which is as good as possible for as long a time as possible.

Further advantages and features of the invention are evident from the claims and also from the following description of a preferred exemplary embodiment of the invention that is illustrated with reference to the drawings.

It goes without saying that the features mentioned above and the features yet to be explained below can be used not only in the respectively stated combination but also in other combinations or alone without departing from the scope of the present invention.

DETAILED DESCRIPTION

Figure 1:
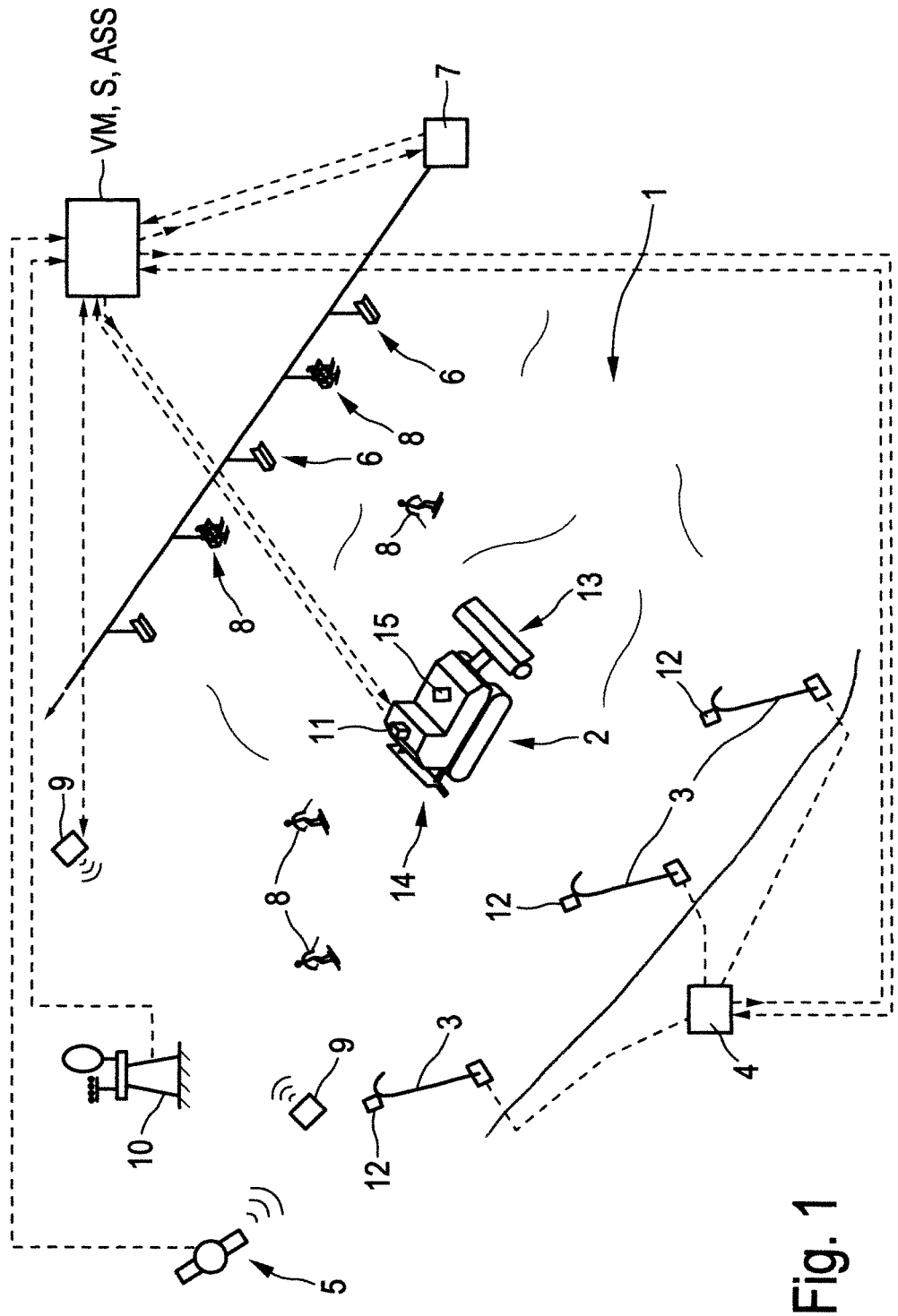
FIG. 1 schematically shows a snow piste that is assigned a computer-aided system for monitoring and maintaining the snow piste in accordance with one preferred embodiment of the invention.

A snow piste 1 according to FIG. 1 is provided in a ski area and has a downward gradient that enables persons 8 engaging in winter sports to go down the snow piste 1, said persons moving along the snow piste downhill. In the present case, the snow piste 1 thus forms a prepared, snow-covered slope. The snow piste 1 is prepared by at least one piste groomer 2. In order to artificially cover the mountain slope and thus the snow piste 1 with snow, provision is made of a snowmaking machine 3 having a plurality of snow producing stations positioned laterally alongside the snow piste. The snow piste 1 is additionally assigned a lift system 6 which conveys persons 8 in the ski area toward the top in order that corresponding persons 8 can move along the mountain slope and thus the snow piste 1. A weather station 10 which can capture and pass on meteorological data MD is additionally illustrated schematically. A light barrier system 9 is provided on the slope side at a starting section of the snow piste 1 and counts persons 8 engaging in winter sports who pass onto the snow piste 1. A control device 4 is assigned to the snowmaking machine 3. A stationary controller device 7 is assigned to the lift system 6 and controls the operation of the lift system 6.

The piste groomer 2 has a travel drive which is used to drive running gear of the piste groomer 2 in order to move and steer the piste groomer forward or backward. On the rear side, the piste groomer 2 has an adjustable rear cutter 13. On the front side, an adjustable clearing blade 14 is arranged on the piste groomer 2. The rear cutter 13 can plunge into a blanket of snow forming the piste surface over an insertion depth for the purpose of preparing a piste surface of the snow piste 1. The rear cutter 13 has at least one cutting shaft which can rotate at a cutting shaft speed when treating the blanket of snow.

Finally, the snow piste is assigned a positioning system 5 which is a satellite-based, global positioning system 5 in the illustration in accordance with FIG. 1.

A lidar sensor system 11 is arranged on the piste groomer 2 in the present case. A further, stationary lidar sensor system 12 is secured on each snow producing station of the snowmaking machine 3. The lidar sensor system 12 of the snow producing stations is used to capture snow volumes and snow height changes of the snow piste 1. The lidar sensor system 11 arranged in mobile fashion on the piste groomer 2 is used to capture snow transport volumes that are moved by the clearing blade 14.

Various dashed lines and arrows are illustrated with reference to FIG. 1 and are intended to represent data transmissions or data exchange. In this regard, the positioning system 5 transmits position and travel data relating to the piste groomer 2 to an electronic data processing system VM, S, ASS. The weather station 10 transmits meteorological data MD to the electronic data processing system VM, S, ASS. The lidar sensor system 11 likewise transmits sensor data to the electronic data processing system VM, S, ASS. Correspondingly conversely, control data are transmitted from the electronic data processing system VM, S, ASS to a central control unit of the piste groomer 2 in order to control the travel drive and/or a clearing blade controller and/or a rear cutter controller. Firstly, the controller device 4 transmits sensor data from the stationary lidar sensor system 12 to the electronic data processing system VM, S, ASS. Secondly, the electronic data processing system VM, S, ASS passes control data, which are provided for the operation of the snowmaking machine 3, to the controller device 4. The light barrier system 9 and also the controller system 7 for the lift system 6 supply data about the number of persons 8 engaging in winter sports who are moving along the snow piste 1 or being conveyed into the ski area. The electronic data processing system VM, S, ASS is coupled to the controller system 7 via a control line in order as necessary to reduce the speed of the lift system 6 in order thereby to convey a smaller number of persons 8 engaging in winter sports into the ski area.

Figure 2:
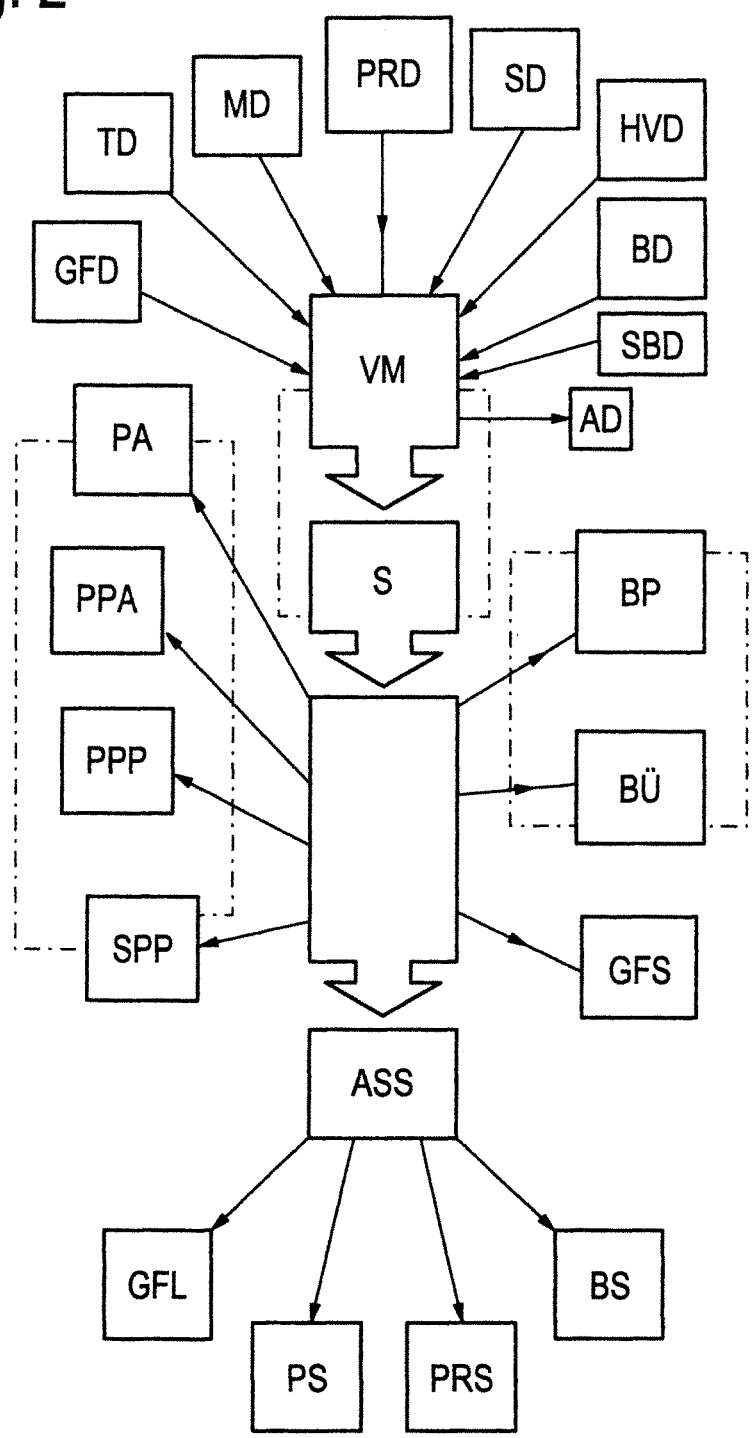
FIG. 2 shows a block diagram for a system according to FIG. 1.

The computer-aided system for monitoring and maintaining a snow piste is illustrated in somewhat greater detail with reference to FIG. 2. Corresponding blocks are connected to other function blocks via arrows, the arrow directions representing the information or data flow between the individual blocks. In the upper region of the block diagram, the abbreviation GFD denotes guest frequency data, the abbreviation TD denotes topography data, the abbreviation MD denotes meteorological data, the abbreviation PRD denotes piste groomer data, the abbreviation SD denotes snow data, the abbreviation HVD denotes snow height and volume data, the abbreviation BD denotes snow covering data, and the abbreviation SBD denotes snow constitution data.

In the middle region of the block diagram, on the left-hand side, the abbreviation PA denotes a piste configuration, the abbreviation PPA denotes a piste preparing expenditure, the abbreviation PPP denotes a piste preparing plan and the abbreviation SPP denotes a snow position plan. On the right-hand side, the block AD denotes output data, the block BP denotes a snow covering plan, the block BU denotes monitoring and control of the snow covering including positionings and orientations of the snow producing stations and the control of the water proportion of the snow produced, i.e. the control of dry and wet snow. In the lower region of the block diagram, GFL denotes guest frequency management, PS denotes piste access control, PRS denotes piste groomer control and BS denotes snow covering control. The abbreviations VM, S and ASS arranged centrally below one another should be understood as meaning overall the central electronic data processing system, the upper block VM symbolizing the calculated prediction model, S symbolizing the block for control instructions and ASS symbolizing an automated assistance system.

The electronic data processing system VM, S, ASS has a memory, not designated in more specific detail, in which target data for one or more optimized states of snow pistes 1 are stored, the target data being structured according to the various actual data that are corresponding input variables for the electronic data processing system VM, S, ASS, i.e. topography data TD, meteorological data MD, data relating to frequenting of the snow piste by persons engaging in winter sports GFD, snow constitution data SD, SBD of a piste surface, travel parameter data and process parameter data, i.e. piste groomer data PRD, snow height and snow volume data HVD. The illustration does not show the time capture unit assigned to the corresponding sensor systems in order to ensure that the sensor data are captured in a time-dependent manner. The electronic data processing system VM, S, ASS processes the sensor data on the basis of time-dependent data changes and calculates the change in the sensor data in a time-dependent manner into the future with formation of the prediction model VM. The calculation can be supplemented by a comparison with the target data mentioned in order subsequently to be able to output specific control instructions for maintaining or for conforming to an optimized piste state of the snow piste 1. The output unit that outputs the output data AD is preferably of digital design and can be embodied as an interface for an output device or else as a terminal. GFS should be understood as meaning the guest frequency control, i.e. an action instruction to an operator of the lift system 6 to increase or to reduce the number of persons to be conveyed.

In order to be able to match the calculated prediction model VM in practice to a desired target model corresponding to an optimized piste state of the snow piste 1, action instructions that are more complex than simple information can be output, which action instructions comprise various plans for the use of the piste groomer 2 on the left-hand side in FIG. 2 and plans for the use of the snowmaking machine 3 on the right-hand side. Accordingly, a dash-dotted bracket is illustrated for action instructions or plans that are assigned to the piste groomer 2, and a further dash-dotted bracket for action instructions or plans that are provided for the operation of the snowmaking machine 3.

A further expansion stage is shown in the lower region of the block diagram. This is because the automated assistance system ASS actively performs controls for guest frequency management GFL, i.e. in accordance with FIG. 1 for controlling the speed of the lift system 6, for controlling piste access PS by way of—not illustrated—signal generators, traffic lights, barriers or digital information panels. In addition, the operation of the piste groomer 2 is actively controlled by suitable controls of the rear cutter 13 and of the clearing blade 14 in order to attain a desired piste surface and desired snow transport. Finally, the controller device 4 of the snowmaking machine 3 is actively controlled in order to correspondingly orient the snow producing stations, to increase or to reduce the throughput of the snow producing stations and to control the water proportion in order to reduce or to increase the moisture in the snow produced. These controls are likewise effected by means of a comparison with target data or target models which represent the optimized piste state and are stored in the electronic data processing system VM, S, ASS.

Persons 8 using the lift system 6 can be counted by scanning tickets. Alternatively or additionally, it is also possible to perform stationary, sector-by-sector capture of mobile phone users in the ski area or in the region of the snow piste 1. The data captured about the snowmaking machine 3 can comprise the location of the snow producing stations, physical operating data relating to the snow producing stations such as water throughput, operating times, ejection angle, water temperature, pivot angle, inclination angle, air throughput and snow quality set.

The state of the snow piste 1 should be understood as meaning, in particular, the degree of wear as a measure of the abrasion caused by persons 8 or environmental influences, in particular bumpy and rutted piste surfaces. A natural topography of the snow piste preferably has the same topography as the underlying mountain slope covered by the snow. The effort for preparing a rutted snow piste concerns, in particular, the smoothing of unevennesses and the compensation of different snow heights at different points on the snow piste. The configuration of the snow piste, i.e. different snow hardnesses such as, in particular, ice at the bottom and slush at the top, or inherently homogeneous with the same hardness, advantageously icy or grippy, can also be captured as actual values or be predefined as target values. Actual data relating to the piste configuration, past weather data, past guest frequency data and underlying topography data TD have to be used as a result.

Action recommendations of the electronic data processing system VM, S, ASS make it possible to initiate measures to keep piste conditions constant over a defined period of time. Specifically, if the piste surface is too soft, hard snow is added and, if the piste surface is too hard, soft snow is added. If the piste surface is too dry, i.e. too powdery, the density is increased by introducing water, whereby the piste surface is made more durable. From weather forecasts, piste state and desired snow height, a plan for the snow covering is established regarding where, when, how much and what quality of snow must be produced. Information for persons 8 engaging in winter sports in the ski area can be output via display panels, via ski area apps, via a website of the ski area or via social media. In this case, snow piste state descriptions such as a degree of wear and the guest capacity utilization of corresponding snow pistes 1 can also be communicated to the persons 8 who are guests in the ski area. As a result, visitor stream management that enables uniform snow piste capacity utilization is achieved in a simple manner.

Piste preparing plans, planned routes and process plans for the operation of the piste groomer 2 can be wirelessly transmitted to the piste groomer 2 and made available to the driver of the piste groomer 2. Process parameters for the rear cutter 13 and the clearing blade 14 can be predefined for the central controller of the piste groomer 2 in an automated manner by the electronic data processing system.

Alternatively, the piste groomer 9 can also be autonomously steered in a driverless manner on the basis of corresponding stipulations of the electronic data processing system VM, S, ASS.

The computer-aided system in FIGS. 1 and 2 has a state sensor system for acquiring state data relating to the snow piste 1. The time capture unit is coupled to the state sensor system in order to capture the state data in a time-dependent manner. The state sensor system comprises at least one sensor system 15 for acquiring snow constitution data SBD relating to the piste surface of the snow piste 1. The electronic data processing system VM, S, ASS is coupled to the state sensor system and to the time capture unit in order to capture the state data and use the latter to calculate the prediction model VM for the state of the snow piste 1 at at least one point in time in the future. The output unit AD is connected to the data processing system VM, S, ASS and outputs information relating to the calculated prediction model VM. In the present case, the state sensor system also comprises a sensor system for capturing snow covering data BD relating to the snow piste 1 and a sensor system for capturing topography data TD relating to the snow piste 1. These sensor systems may be the lidar sensors 11, 12 present on the piste groomer 2 and on the snow producing stations of the snowmaking machine 3. The time capture unit is coupled to the respective sensor system in order to capture the snow covering data BD, the topography data TD and the snow constitution data SBD in a time-dependent manner. The electronic data processing system VM, S, ASS is coupled to the sensor systems and the time capture unit in order to capture the data and use the latter to calculate the prediction model VM for a state of the snow piste 1 at at least one point in time in the future.

In the present case, the piste groomer 2 of the computer-aided system comprises a sensor system 15 for acquiring the snow constitution data SBD. This sensor system 15 is arranged on the piste groomer 2 such that it is fixed to the vehicle. For example, the sensor system 15 is arranged on a penetration device of the piste groomer 2 that is not illustrated in any more detail and is in the form of a blade, for example. This blade is configured to plunge into the piste surface to a substantially constant depth when traveling on the piste surface and to be pulled through the blanket of snow of the snow piste 1. The sensor system 15 acquires the snow constitution data SBD in the process. Alternatively or additionally, at least one sensor system arranged on the piste groomer 2 may be configured to acquire structure-borne sound frequencies. Such structure-borne sound frequencies are transmitted to the piste groomer 2 when preparing the snow piste 1 by means of the piste groomer 2 on the basis of the constitution of the piste surface. The constitution of the blanket of snow can therefore be determined, in particular in a contactless manner, by acquiring the structure-borne sound frequencies. Accordingly, the sensor system for acquiring the structure-borne sound frequencies is used to acquire the snow constitution data SBD.

Alternatively or additionally, the computer-aided system may also comprise a sensor system for acquiring the snow constitution data SBD, which sensor system is not shown in the figures and is arranged on the piste surface. For example, such a sensor system may be embedded in a blanket of snow of the piste surface. It goes without saying that a plurality of such sensor systems may be distributed over the piste surface in a network-like or cluster-like manner.

In the present case, at least one sensor system is configured to acquire the state data in a continuous or temporally clocked manner. Accordingly, the snow constitution data SBD are acquired in a continuous or temporally clocked manner. The electronic data processing system VM, S, ASS has an interface for connection to a capture unit for meteorological data MD. This interface can be used to couple the data processing system VM, S, ASS to the weather station 10 in a data-transmitting manner. In the present case, the piste groomer 2 is assigned an electronic data capture unit, to which the electronic data processing system VM, S, ASS is wirelessly coupled. The electronic data capture unit captures position data and/or travel data relating to the piste groomer 2 and/or process parameters of the rear cutter 13 and of the clearing blade 14 of the piste groomer 2. The electronic data processing system VM, S, ASS is also wirelessly connected to a control unit of the piste groomer 2 in order to communicate control instructions for controlling a travel drive and/or a rear cutter controller and/or a clearing blade controller to the control unit.

The electronic data processing system VM, S, ASS is coupled in a wireless or wired manner to a stationary counting device. This stationary counting device is used to directly or indirectly capture persons 8 who are engaging in winter sports and frequenting the snow piste 1. The electronic data processing system VM, S, ASS is coupled in a wireless or wired manner to the control device 4 of the snowmaking machine 3 in order to communicate control instructions for snow covering to the control device 4.

The computer-aided system illustrated in FIGS. 1 and 2 is used to carry out a computer-aided method according to the invention for maintaining the snow piste 1. In this case, FIG. 1 shows the system when carrying out the computer-aided method. According to the method, state data relating to the snow piste 1 are captured in a time-dependent manner. The state data comprise snow constitution data SBD which depend on the constitution of the piste surface of the snow piste 1. The prediction model VM for the state of the snow piste 1 at at least one point in time in the future is calculated from the captured state data. According to the method, information AD relating to the prediction model VM is also output. For example, the state data comprise—in addition to the snow constitution data SBD—snow covering data BD relating to the snow piste 1 and topography data TD relating to the snow piste 1. The snow covering data BD, the topography data TD and the snow constitution data SBD are each captured in a time-dependent manner. In the present case, the snow constitution data SBD are acquired by means of at least one piste groomer 2 in a travel mode of the at least one piste groomer 2. The snow constitution data SBD may be acquired by means of the at least one piste groomer 2 while the snow piste 1 is being prepared by means of the piste groomer 2. A snow hardness or/and a snow temperature or/and a water proportion of the piste surface is/are acquired by the sensor system 15 arranged on the piste groomer 1 for the purpose of acquiring the snow constitution data SBD.

According to the method, data relating to the frequenting of the snow piste 1 by persons 8 engaging in winter sports are captured in a time-dependent manner. These data are used to calculate the prediction model VM. Control instructions S for operating the at least one piste groomer 2 on the snow piste 1 are generated on the basis of the prediction model VM. Alternatively or additionally, control instructions S for operating the snowmaking machine 3 are generated on the basis of the prediction model VM. Alternatively or additionally, control instructions S for access to the snow piste 1 for persons 8 engaging in winter sports are generated on the basis of the prediction model VM. The control instructions S are output. The control instructions S may be output, for example, to the driver of the at least one piste groomer 2, operating personnel of the snowmaking machine 3 and operating personnel of the lift system 6. The control instructions S may be accordingly passed to the piste groomer 2 or/and the snowmaking machine 3 or/and to stationary devices 6 for controlling access to the snow piste 1 for persons 8 engaging in winter sports.

The computer-aided method also provides for the constitution of the piste surface to be adapted, at least in certain areas, by means of the at least one piste groomer 2 on the basis of the control instructions S. Alternatively or additionally, the constitution of the piste surface is adapted by means of the snowmaking machine 3. For example, such adaptation of the constitution of the piste surface is carried out as required. That is to say, the piste surface is adapted only at the locations at which and only to the extent to which this is required according to the prediction model VM for a constantly good piste constitution. Pushing work by means of the piste groomer 2, a preparation time and situational use of snow covering can therefore be coordinated with one another by means of the control instructions S on the basis of the prediction model VM in order to achieve and maintain a piste state which is as optimum as possible.

When capturing the snow constitution data SBD, time-dependent data records of the snow constitution data SBD are generated. These data records comprise, for each capture, mutually assigned time data, geographical location data and quality data relating to the piste surface. In this case, depth ordinates can be assigned to the quality data for each capture. The snow constitution data SBD therefore represent which quality data are available at what snow depth, at what time and at which geographical location. In this case, the quality data may comprise a snow hardness or/and a snow temperature or/and a snow density or/and a water proportion. Accordingly, the snow constitution data SBD may indicate the time at which, the location at which and the depth at which a particular snow hardness, a particular snow temperature, a particular snow density or/and a particular water proportion is/are present in the blanket of snow of the piste surface. The snow constitution data can be selectively captured at various points of the snow piste. A statement relating to the snow constitution on the entire piste surface can be calculated from the individual capture operations by means of the prediction model. In particular, the prediction model also comprises developments in the snow constitution over the piste surface. The constitution of the blanket of snow can be assessed with constitution attributes such as "powdery", "icy", "crusty", "grippy" or "slushy" on the basis of the snow constitution data. Such constitution attributes may likewise be assigned on the basis of a snow depth.

The state data comprise, for example, snow height and volume data HVD relating to the snow piste 1 or/and topography data TD relating to the snow piste 1. According to the method, current or/and future meteorological data MD for an environment of the snow piste 1 may also be captured in a time-dependent manner and used to calculate the prediction model VM. In addition, travel parameters or/and process parameters of at least one piste groomer 2 preparing the snow piste 1 can be captured in a time-dependent manner and used to calculate the prediction model VM. The state data relating to the snow piste 1 can be displayed by means of a display apparatus. Such a display apparatus may comprise a virtual map that illustrates what constitution of the snow piste 1 can be found at which geographical location. On the basis of the prediction model VM, it is also possible to indicate what constitution of the snow piste 1 will be able to be found at which location of the snow piste 1 at at least one point in time in the future. With otherwise given boundary conditions, an expected development of the meteorological data MD and preparation of the snow piste 1 that is matched thereto and expected frequenting of the snow piste 1 can be taken into account in this prediction. The computer-aided system may comprise a stationary device for controlling frequenting of the snow piste 1. The electronic data processing system VM, S, ASS may be coupled in a wireless or wired manner to this device in order to communicate control instructions for changing the frequenting of the snow piste 1.

In the present case, the piste groomer 2 is controlled on the basis of the captured time-dependent snow constitution data SBD. In this case, information for controlling the route or/and functional parameters of the rear cutter 13 or/and of the clearing blade 14 can be output to the driver of the piste groomer 2 or/and to an autonomous control system for the piste groomer 2. For example, corresponding information relating to the insertion depth of the rear cutter 13 or/and the cutting shaft speed can be output. Automatic control of the insertion depth of the rear cutter 13 or/and the cutting shaft speed or/and a position of the clearing blade 14 or/and a route and a travel speed of the piste groomer 2 is also conceivable.

The invention claimed is:

1. A computer-aided method when implemented on a computer for maintaining a snow piste, according to which state data relating to the snow piste are captured in a time-dependent manner, wherein
   the state data comprise snow constitution data which depend on a constitution of a piste surface of the snow piste, and
   a prediction model for the state of the snow piste at at least one point in time in the future is calculated from the captured state data, and
   information relating to the prediction model is output to a driver of a piste groomer and/or to an autonomous control system for the piste groomer;
      wherein, when capturing the snow constitution data, time-dependent data records of the snow constitution data are generated and, for each capture, comprise mutually assigned time data, geographical location data and quality data relating to the piste surface,
      data relating to frequenting of the snow piste by persons engaging in winter sports are captured in a time-dependent manner and are used to calculate the prediction model.

2. The computer-aided method according to claim 1, wherein the state data comprise snow covering data relating to the snow piste and topography data relating to the snow piste, wherein the snow covering data, the topography data and the snow constitution data are each captured in a time-dependent manner.

3. The computer-aided method according to claim 1, including at least one of the following:
   the snow constitution data are acquired by at least one piste groomer in a travel mode of the at least one piste groomer; and
   a snow hardness or/and a snow temperature or/and a water proportion of the piste surface is/are acquired for the snow constitution data.

4. The computer-aided method according to claim 1, wherein control instructions for operating at least one piste groomer on the snow piste or/and for operating a snowmaking machine for the snow piste or/and for access to the snow piste for persons engaging in winter sports are generated on the basis of the prediction model.

5. The computer-aided method according to claim 4, wherein the control instructions are passed to the piste groomer and/or the snowmaking machine and/or to stationary devices for controlling access to the snow piste for persons engaging in winter sports, and wherein a constitution of the piste surface is adapted, at least in certain areas, by the at least one piste groomer or/and the snowmaking machine on a basis of the control instructions.

6. The computer-aided method according to claim 1, wherein:
depth ordinate data are assigned to the quality data for each capture; and,
the quality data comprise at least one of the following:
a snow hardness;
a snow temperature;
a snow density; and
a water proportion; and
the state data comprise snow height and volume data relating to the snow piste or/and topography data relating to the snow piste.

7. The computer-aided method according to claim 1, further including at least one of the following:
current or/and future meteorological data for an environment of the snow piste are captured in a time-dependent manner and are used to calculate the prediction model;
travel parameters or/and process parameters of at least one piste groomer preparing the snow piste are captured in a time-dependent manner and are used to calculate the prediction model;
the captured state data are displayed via a display apparatus; and
the at least one piste groomer is controlled on the basis of the captured time-dependent snow constitution data.

8. The computer-aided method according to claim 1, wherein information for controlling at least one of the following is output to the driver of the piste groomer or/and to an autonomous control system for the piste groomer:
a route or/and functional parameters of a rear cutter or/and of a clearing blade;
an insertion depth of the rear cutter; and
a cutting shaft speed.

9. A computer-aided system for carrying out the method according to claim 1,
having a state sensor system for acquiring state data relating to a snow piste, and
having a time capture unit which is coupled to the state sensor system in order to capture the state data in a time-dependent manner, wherein
the state sensor system comprises at least one sensor system for acquiring snow constitution data relating to the piste surface of the snow piste, and
an electronic data processing system is provided and is coupled to the state sensor system and the time capture unit in order to capture the state data and use the latter to calculate the prediction model for the state of the snow piste at at least one point in time in the future, and
an output unit is connected to the electronic data processing system and outputs information relating to the calculated prediction model.

10. The computer-aided system according to claim 9, wherein the state sensor system comprises a sensor system for capturing snow covering data relating to the snow piste and a sensor system for capturing topography data relating to the snow piste, wherein the time capture unit is coupled to the respective sensor system in order to capture the snow covering data, the topography data and the snow constitution data in a time-dependent manner, wherein the electronic data processing system is coupled to the sensor systems and to the time capture unit in order to capture the data and use the latter to calculate the prediction model for a state of the snow piste at at least one point in time in the future.

11. The computer-aided system according to claim 10, wherein at least one sensor system for acquiring the snow constitution data is arranged on the piste surface.

12. The computer-aided system according to claim 10, further including at least one of the following:
at least one sensor system is configured to acquire the state data in a continuous or temporally clocked manner;
the electronic data processing system has an interface for connection to a capture unit for meteorological data; and
the electronic data processing system is wirelessly coupled to an electronic data capture unit which is assigned to at least one piste groomer and captures position data and/or travel data relating to the piste groomer and/or process parameters of a rear cutter and of a clearing blade of the piste groomer.

13. The computer-aided system according to claim 10, further including at least one of the following;
the electronic data processing system is coupled in a wireless or wired manner to a stationary counting device for directly or indirectly capturing persons who are engaging in winter sports and frequenting the snow piste;
the system comprises at least one stationary snowmaking machine assigned to the snow piste, wherein the electronic data processing system is coupled in a wireless or wired manner to a control device of the snowmaking machine in order to communicate control instructions for snow covering to the control device;
the electronic data processing system is wirelessly connected to a control unit of the piste groomer in order to communicate control instructions for controlling a travel drive and/or a rear cutter controller and/or a clearing blade controller to the control unit; and
a stationary device for controlling frequenting of the snow piste is provided, wherein the electronic data processing system is coupled in a wireless or wired manner to the device in order to communicate control instructions for changing the frequenting of the snow piste.

14. The computer-aided system according to claim 9, wherein the system comprises at least one piste groomer, and at least one of the sensor systems for acquiring the snow constitution data is arranged on the piste groomer.

15. The computer-aided system according to claim 14, wherein at least one sensor system arranged on the piste groomer is arranged on a penetration device of the piste groomer, which is configured to plunge into the piste surface at a substantially constant depth when traveling on the piste surface and to be pulled through a blanket of snow, and/or at least one sensor system arranged on the piste groomer is configured to acquire structure-borne sound frequencies which, when preparing the snow piste by the piste groomer, are transmitted to the piste groomer on the basis of the constitution of the piste surface in order to acquire snow constitution data.

* * * * *